United States Patent [19]

Sato

[11] Patent Number: 5,937,136
[45] Date of Patent: Aug. 10, 1999

[54] VIDEO DATA EDIT/REPRODUCTION APPARATUS FOR VIDEO DATA WHICH MIXEDLY INCLUDES MOVING AND STILL IMAGES

[75] Inventor: Masao Sato, Hidaka, Japan

[73] Assignee: Olympus Optical Co., Ltd., Tokyo, Japan

[21] Appl. No.: 08/812,468

[22] Filed: Mar. 6, 1997

[30] Foreign Application Priority Data

Apr. 1, 1996 [JP] Japan .................................... 8-078938

[51] Int. Cl.[6] ...................................................... H04N 5/76
[52] U.S. Cl. ................................ 386/52; 386/95; 386/125
[58] Field of Search ................................. 386/46, 52, 65, 386/1, 125, 126, 95, 83, 106, 68, 82; 369/32, 48; H04N 5/76, 5/781

[56] References Cited

U.S. PATENT DOCUMENTS

| | | | |
|---|---|---|---|
| 4,970,608 | 11/1990 | Fukuda et al. | 386/52 |
| 5,546,365 | 8/1996 | Roth | 369/32 |
| 5,638,346 | 6/1997 | Arramaki | 386/1 |
| 5,651,087 | 7/1997 | Nagano et al. | 386/126 |
| 5,675,695 | 10/1997 | Hirayama et al. | 386/95 |

FOREIGN PATENT DOCUMENTS

521487A1  1/1993  European Pat. Off. .

Primary Examiner—Huy Nguyen
Attorney, Agent, or Firm—Frishauf, Holtz, Goodman, Langer & Chick, P.C.

[57] ABSTRACT

A video data edit/reproduction apparatus includes an operation unit, a recording unit, a storage unit, and a reproduction unit in order to edit and reproduce video data recorded in a predetermined recording medium together with at least one of address information and time information on the recording medium. The operation unit designates desired portions of the video data recorded in the predetermined recording medium, and designates the reproduction order of the video data at the desired portions. The recording unit records, as edit information in a preset area of the predetermined recording medium together with the reproduction order, at least one of address information and time information on the predetermined recording medium for the video data at the desired portions designated by the operation unit. The storage unit reproduces and stores the edit information recorded by the recording unit in the preset area of the predetermined recording medium. The reproduction unit reproduces the video data at the desired portions from the video data recorded in the predetermined recording medium in the reproduction order in accordance with the edit information from the storage unit.

17 Claims, 9 Drawing Sheets

1 TO 9 : REPRODUCTION TIME OF EACH SCENE OBTAINED BY COMPARISON BETWEEN REPRODUCTION TIME AND TOTAL TIME

VIDEO DATA EDIT/REPRODUCTION APPARATUS FOR VIDEO DATA WHICH MIXEDLY INCLUDES MOVING AND STILL IMAGES

BACKGROUND OF THE INVENTION

The present invention relates to a video data edit/reproduction apparatus and, more particularly, to a video data edit/reproduction apparatus which can edit and reproduce video data such as moving and still images recorded in a recording medium such as a random-access optical disk in an order to allow a user to easily appreciate the image.

An apparatus which shortens the read time of moving images such as video information recorded in, e.g., an optical disk has conventionally been proposed.

An edit apparatus for synthesizing a plurality of video portions recorded in a recording medium, and a copying/recording apparatus or a dubbing apparatus for copying an output from one reproducer to a large number of recording media by a large number of recorders have also been proposed.

However, e.g., synthesis of two images recorded in a recording medium cannot be performed by one recording/reproduction apparatus, and requires at least two recording/reproduction apparatuses or edit apparatuses.

Basically, to change the reproduction order of images recorded once in the recording medium, the images must be edited. For this purpose, desired images must be copied from the medium in which the original images are recorded.

The resultant images having undergone image editing therefore are susceptible to degradation in image quality itself due to dubbing processing including copying and the like. At the same time, another recording medium is required to record the images, other than the medium in which the original images are recorded, resulting in various disadvantages in cost and operation management.

BRIEF SUMMARY OF THE INVENTION

It is therefore an object of the present invention to provide a video data edit/reproduction apparatus which can perform desired editing/reproduction only by recording, in a predetermined area of a recording medium, edit information which designates, of images recorded in the recording medium, the ranges of images desired by the user, and the reproduction order, without exchanging or dubbing original images recorded in the recording medium, unlike in a conventional case.

According to the first aspect of the present invention, there is provided a video data edit apparatus for editing video data recorded in a predetermined recording medium together with at least one of address information and time information on the recording medium, comprising:
 operation means for designating desired portions of the video data recorded in the predetermined recording medium, and designating a reproduction order of the video data at the desired portions; and
 recording means for recording, as edit information in a present area of the predetermined recording medium together with the reproduction order, at least one of address information and time information on the predetermined recording medium for the video data at the desired portions designated by the operation means.

According to the second aspect of the present invention, there is provided a video data reproduction apparatus for reproducing video data recorded in a predetermined recording medium together with at least one of address information and time information on the recording medium, comprising:
 storage means for reproducing and storing edit information recorded in a preset area of the predetermined recording medium,
 the edit information including at least one of address information and time information on the predetermined recording medium corresponding to video data of desired portions designated in advance, and a reproduction order for the video data at the desired portions; and
 reproduction means for reproducing the video data at the desired portions from the video data recorded in the predetermined recording medium in the reproduction order in accordance with the edit information from the storage means.

According to the third aspect of the present invention, there is provided a video data edit/reproduction apparatus for editing and reproducing video data recorded in a predetermined recording medium together with at least one of address information and time information on the recording medium, comprising:
 operation means for designating desired portions of the video data recorded in the predetermined recording medium, and designating a reproduction order of the video data at the desired portions;
 recording means for recording, as edit information in a preset area of the predetermined recording medium together with the reproduction order, at least one of address information and time information on the predetermined recording medium for the video data at the desired portions designated by the operation means;
 storage means for reproducing and storing the edit information recorded by the recording means in the preset area of the predetermined recording medium; and
 reproduction means for reproducing the video data at the desired portions from the video data recorded in the predetermined recording medium in the reproduction order in accordance with the edit information from the storage means.

According to the fourth aspect of the present invention, there is provided a video data edit apparatus for editing video data recorded in a video recording disk together with at least one of address information and time information on the video recording disk, comprising:
 operation means for designating desired portions of the video data recorded in the video recording disk, and designating a reproduction order of the video data at the desired portions; and
 recording means for recording, as a reproduction program in a preset area of the video recording disk together with the reproduction order, at least one of address information and time information on the video recording disk for the video data at the desired portions designated by the operation means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE INVENTION

Reference will how be made in detail to the presently preferred embodiments of the invention as illustrated in the accompanying drawings, in which like reference characters designate like or corresponding parts throughout the several drawings.

Embodiments of the present invention will be listed below to describe the gist of the present invention with reference to the several views of the drawing.

First Embodiment

First, a video data edit/reproduction apparatus according to the first embodiment will be described with reference to FIGS. 1 to 6.

Figure 1:
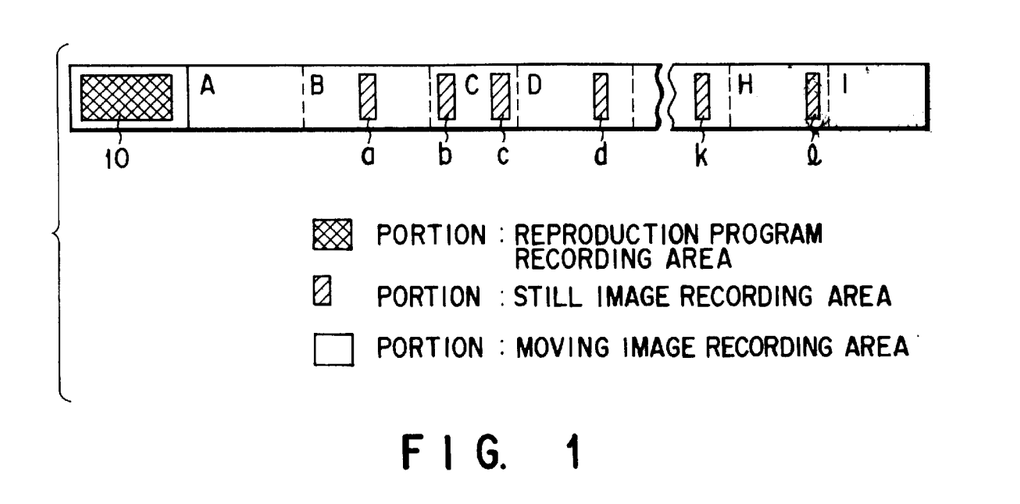
FIG. 1 is a schematic view showing the recorded/stored states of moving and still images recorded in a recording medium.

FIG. 1 schematically shows the recorded/stored states of moving and still images recorded in a certain recording medium. Areas A to I shown in FIG. 1 are moving image recording areas in which moving images are recorded, and areas a to 1 are still image areas in which still images are recorded.

In this example, while recording a given moving image in the area B, a related still image a is simultaneously recorded.

More specifically, e.g., a scene of a sports meeting is physically recorded in this area B, and a still image a of this sports meeting is partially recorded in this area B.

That is, the moving and still images are mixedly recorded in the same recording medium at random.

This recording medium has a "reproduction program recording area" at a predetermined location, e.g., in the leading end area of recording areas shown in FIG. 1. This reproduction program recording area records a "reproduction program" 10 consisting of edit information such as the reproduction order and recording positions of recorded scenes (e.g., "time code" and "address" to be described later) in accordance with a predetermined rule (to be described later) in order to edit and reproduce video data recorded in the recording medium in a form desired by the user.

Figure 2:
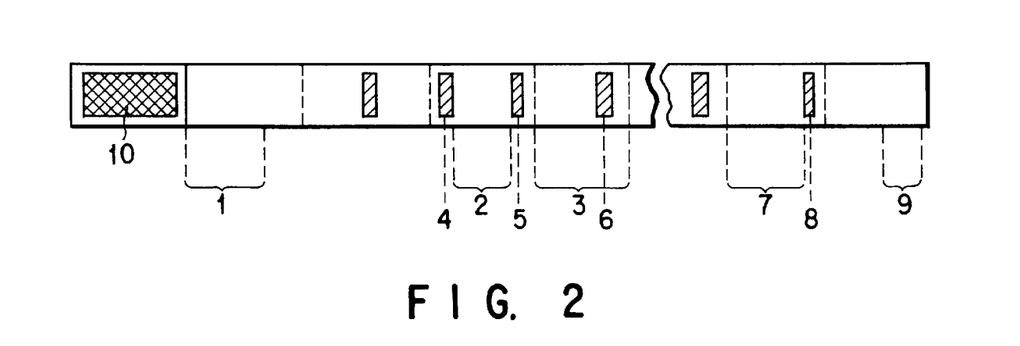
FIG. 2 is a schematic view showing the reproduction order (to be referred to as a reproduction pattern hereinafter) in the edit scheme shown in FIG. 1.

FIG. 2 shows the order of reproducing the video data recorded and stored in the above form of FIG. 1, and exemplifies a case wherein scenes desired by the user to see, i.e., target edit scenes are given "scene image numbers" and reproduced in accordance with numbers 1 to 9.

Assume that the numbers shown in FIG. 2 increase in the ascending order in which the user wants to see scenes. The user determines the scene image numbers 1 to 9 as a reproduction program in a desired order by using a predetermined means of the image edit/reproduction apparatus of the present invention.

Note that an "address" as information about a positional recording area (i.e., an address) representing the position of image information corresponding to each scene on the recording medium is set and recorded in this recording medium in advance, together with a "time code" as time information about the video recording.

The "reproduction program" 10 determined by using these "address" and "time code" is originally added to the recording medium. Alternatively, if a recording medium itself used for a certain recorder/reproducer has a dedicated recording area, the "reproduction program" 10 may be recorded in this area.

In either case, physical position information on the recording medium, time information, and the reproduction order based on the time codes and the addresses in correspondence with the numbers 1 to 9 of the scenes which the user wants to see are recorded as the "reproduction program" 10 in a predetermined "reproduction program recording area" on the recording medium.

As an effect of this edit/reproduction scheme, e.g., when the user reproduces scenes the next time, the user can reproduce desired scenes in a desired reproduction order on the basis of the "reproduction program" 10 including the time codes and addresses of the desired scenes.

Even if the same recording medium has scenes which the user does not want to see, these scenes can be practically eliminated to make reproduction simple.

The "reproduction program" 10 including the time codes and addresses of scenes which the user wants to see is recorded in part of the recording medium, i.e., the "reproduction program recording area" capable of recording information about the reproduction order and image recording areas. By recording, in this "reproduction program recording area", a "reproduction pattern" desired by the user, i.e., scenes to be reproduced and the order, the user can see the desired scenes in the desired order in reproduction in accordance with the "reproduction program" every time the user wants to see the scenes.

Once this reproduction program is recorded, the user can perform so-called "program reproduction" in which only some scenes desired by the user are preferentially reproduced.

Figure 3:
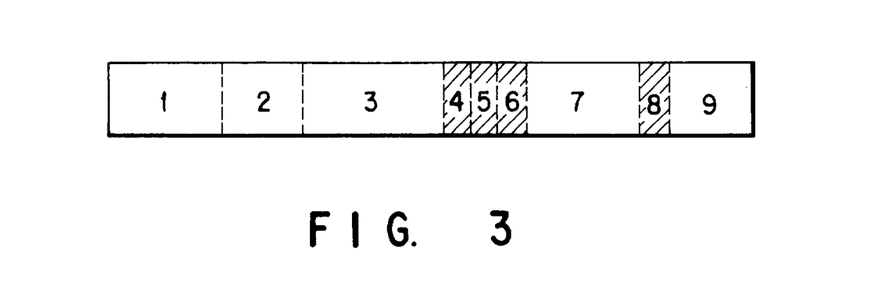
FIG. 3 is a schematic view showing the reproduction pattern of edit video data shown in FIG. 2.

FIG. 3 schematically shows the progress of the reproduction order of the edit images shown in FIG. 2, and FIGS. 4A, 4B, and 4C show other reproduction patterns of the reproduction order.

In a so-called "edit model" in editing or "reproduction mode" in reproduction upon selection of desired moving and still images, a reproduction pattern is determined to reproduce still images after moving images or to reproduce moving images after still images. By reproducing images in such a mode, the user can see still images as if he/she saw an "album".

Figure 4A:
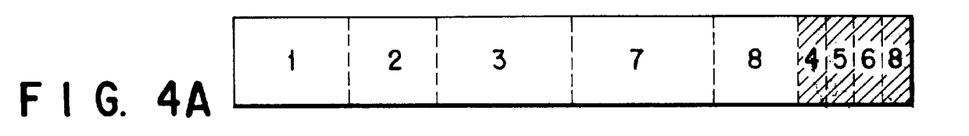
FIG. 4A is a schematic view showing a reproduction pattern used to confirm the outline afterward by still images.

Normally, the user often reproduces moving and still images in a mixed manner, as shown in FIG. 3. However, as shown in FIG. 4A, the user also often reproduces still images of impressive scenes after he/she sees moving images.

Figure 4B:
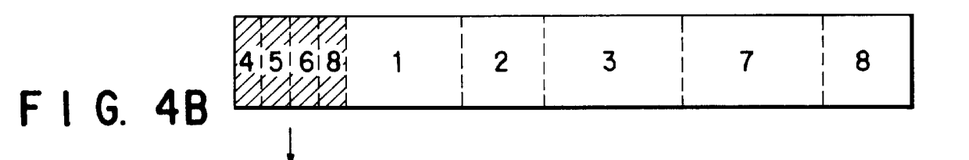
FIG. 4B is a schematic view showing a reproduction pattern used to confirm the outline in advance by still images.

If the user sees still images before recorded moving images, as shown in FIG. 4B, he/she can quickly know the rough contents of the moving images in advance, and can rapidly, easily understand the outline.

Figure 4C:
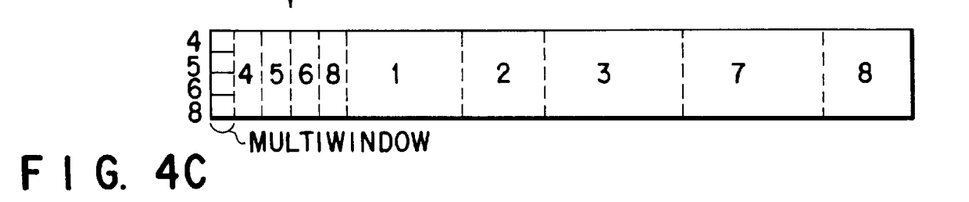
FIG. 4C is a schematic view showing a reproduction pattern used to confirm the outline by still images in a multiwindow.

Further, if needed, it is also effective to display and output still images in a "multiwindow", as shown in FIG. 4C. Images can also be edited in a pattern which matches such an output operation.

It can therefore be understood that this edit/reproduction scheme can be preferably used in various reproduction forms as described above.

Figure 5:
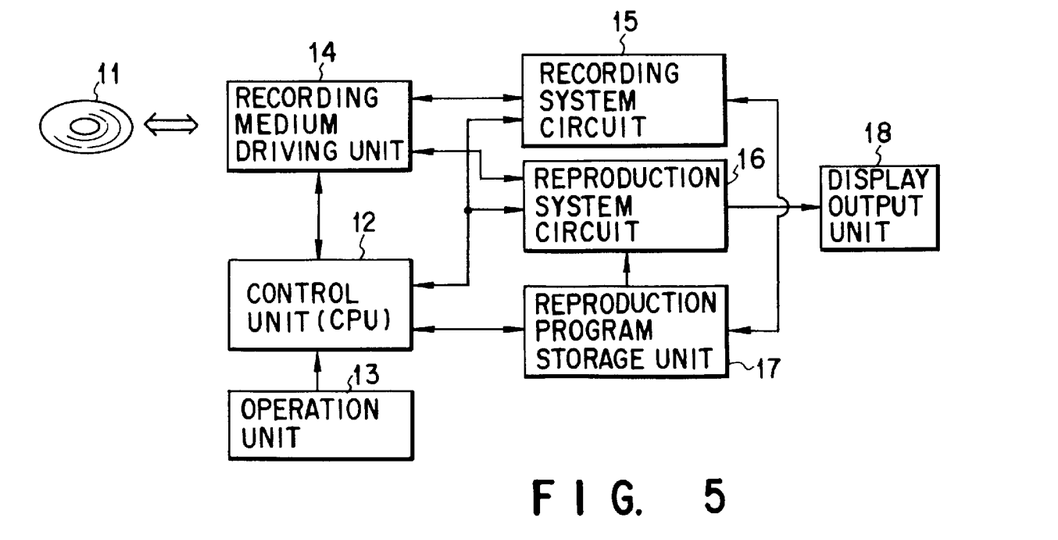
FIG. 5 is a block diagram showing the arrangement of a video data edit/reproduction apparatus according to the first embodiment of the present invention.

FIG. 5 is a block diagram showing the arrangement of the video data edit/reproduction apparatus according to the first embodiment of the present invention.

The video data edit/reproduction apparatus of the present invention is an apparatus of recording edit information in a recording medium in which a plurality of video data are recorded in advance, and reproducing video data on the basis of the edit information. This video data edit/reproduction apparatus is constituted by the following constitutional elements.

The video data edit/reproduction apparatus mainly consists of a portion for recording the edit information in the recording medium, a portion for reproducing the edit information and the video data from the recording medium, and an operation portion for allowing the user to input an edit instruction.

More specifically, the video data edit/reproduction apparatus has a random (direct)-access recording medium 11 as a disk capable of optically recording video data, a recording medium driving unit 14 for driving to rotate the recording medium 11, a recording system circuit 15 for recording/writing desired edit information in the recording medium 11, a reproduction system circuit 16 for reading/reproducing desired information from the recording medium 11, a control unit 12 having a CPU, as a main component, which executes a reproduction program (to be described later) to control the overall apparatus, a reproduction program storage unit 17 serving as a memory which temporarily stores a reproduction program consisting of reproduction scenes recorded in the recording medium and predetermined information for defining the order, an operation unit 13 which allows the operator to input an instruction by operating a keyboard, a mouse, or the like, and a display output unit 18 for displaying edited video images.

The recording system circuit 15 and the reproduction system circuit 16 respectively perform recording and reproduction of the reproduction program with respect to the recording medium.

In actual reproduction, the reproduction system circuit 16 sequentially reads predetermined images from the recording medium in accordance with this reproduction program, and reproduces and displays them on the display output unit 18 in real time while randomly accessing the recording medium in a predetermined order.

The number of reproduction program recording area is not limited to one. The reproduction program recording area may be constituted to identifiably record various types of reproduction programs. With this arrangement, reproduction patterns can be selectively used depending on desired purposes, resulting in a convenient operation.

Figure 6:
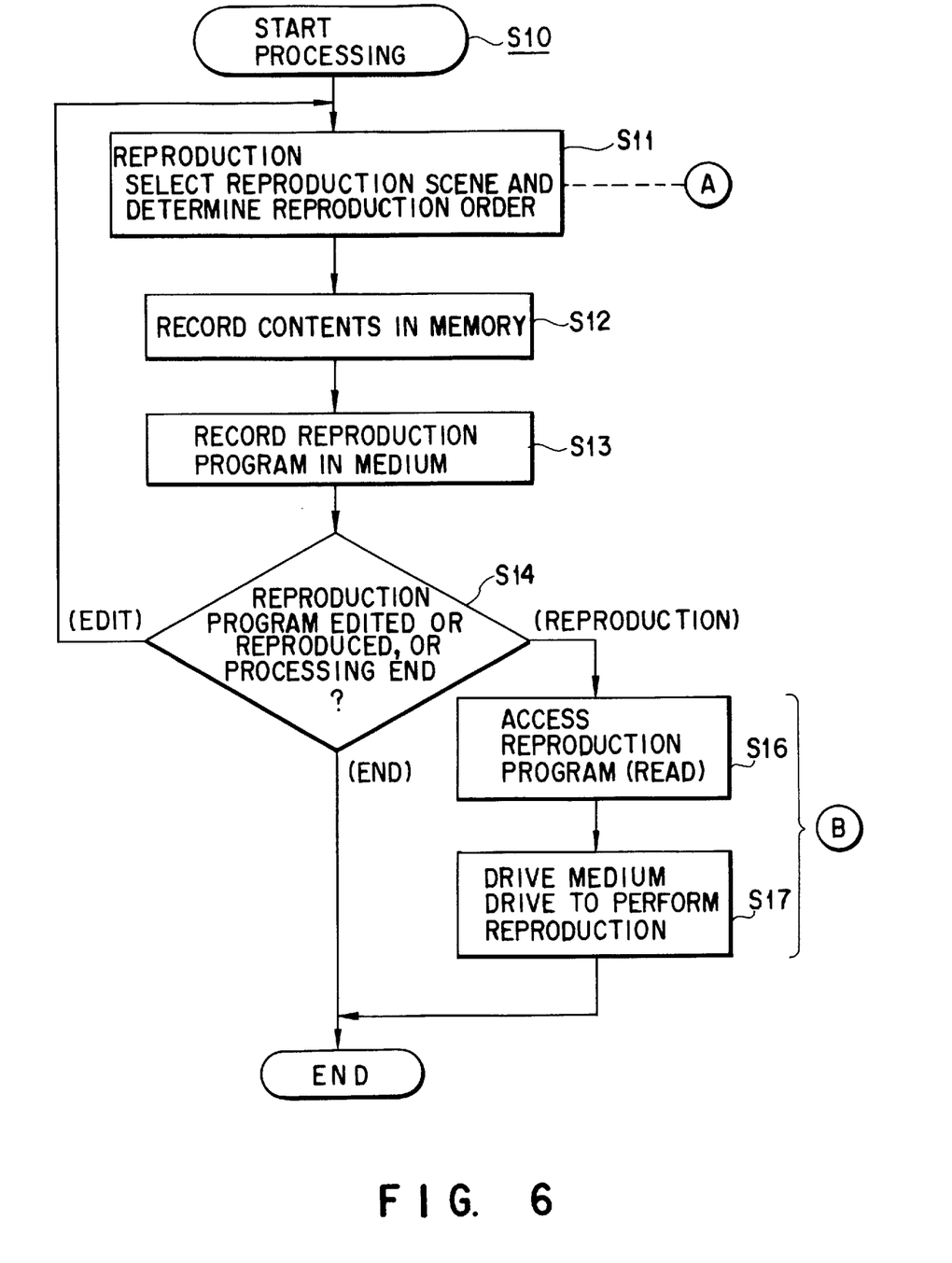
FIG. 6 is a flow chart showing the processing procedure of the video data edit/reproduction apparatus according to the first embodiment.

FIG. 6 is a flow chart showing the processing procedure of the video data edit/reproduction apparatus according to the first embodiment.

The video data edit/reproduction apparatus of the present invention has at least two modes, i.e., the "edit mode" and the "reproduction mode" as its functions. This video data edit/reproduction apparatus can reproduce video data on the monitor by reproducing the video data edited in the "edit model" in the "reproduction mode" and outputting and displaying them on the display output unit 18.

As indicated by A in FIG. 6, processing according to the following operation procedure is performed in the "edit mode".

First in step S11, video data recorded in the recording medium 11 is reproduced by the reproduction system circuit 16 and displayed on the display output unit 18.

The operator edits video data (i.e., creates a reproduction program) while observing the display.

That is, the operator selects the areas of desired scenes (e.g., positions on the recording medium, or the lengths of the scenes) from the video data (see FIG. 1) recorded in the recording medium 11, determines the order of reproducing the selected scenes, and performs selection designation with the operation unit (step S11; see FIG. 2).

The reproduction program utilizes, as identification information, time information "time code" or address information "address" in a predetermined form which is added to the recording medium in advance in correspondence with the area of a desired scene.

The reproduction program generated in the above manner is temporarily stored in the reproduction program storage unit 17 in the video data edit/reproduction apparatus (step S12), and then recorded in a recording area set in the recording medium 11 in advance (step S13).

The mode is checked (step S14), and if the operator wants to execute the above-described "edit mode" again, the flow returns to step S11.

To the contrary, if the operator wants to end the flow, the flow is forcibly ended; if the operator selects the "reproduction mode", processing is performed in accordance with the following operation procedure (B in FIG. 6).

The reproduction program is read from the recording medium 11 and stored in the reproduction program storage unit 17 (step S16).

In this case, when the flow immediately advances from the above-described edit mode to this reproduction mode, the reproduction program can be directly read out from the reproduction program storage unit 17.

If, however, a certain recording medium 11 is ejected (i.e., unloaded) once from the video data edit/reproduction apparatus, and another recording medium recording a reproduction program is inserted in the video data edit/reproduction apparatus, the reproduction program must be read from a predetermined recording area on this recording medium.

In this manner, the video data are displayed on the display output unit 18 in the order (see FIG. 3) the video data was edited by driving the recording medium driving unit 14 in accordance with the reproduction program stored in the reproduction program storage unit 17 (step S17).

In this case, for example, it is also possible depending on selection of the operator to reproduce only moving images first and then still images (see FIG. 4A), or to reproduce only still images first and then moving images (see FIG. 4B).

In addition, it is also possible to perform, prior to the above reproduction operation, so-called "multiwindow display" of simultaneously displaying a plurality of still images on one screen of the display output unit 18 (see FIG. 4C).

The video data edit/reproduction apparatus of the first embodiment has the following effects.

First, this apparatus does not require a rewrite accompanied by copying so as to physically move the recording location of video data in the recording medium 11. Images can therefore be safely edited in a short period of time. At the same time, an image free from any degradation in image quality can be provided even with an analog recording scheme.

Since images can also be reproduced in the order shown in FIG. 4B or 4C, the contents of certain moving images, or the contents of all images recorded in the recording medium can be roughly understood, and rapid image retrieval can be achieved.

Further, since the display output unit 18 is arranged in the main body of the video data edit/reproduction apparatus, edit video data can be directly, rapidly reproduced.

Moreover, since a plurality of reproduction programs having difference reproduction orders can be recorded in the same recording medium, various video edit operations can be performed for the same video data.

Second Embodiment

A video data edit/reproduction apparatus according to the second embodiment of the present invention will be described with reference to FIGS. 7 and 8.

Figure 7:
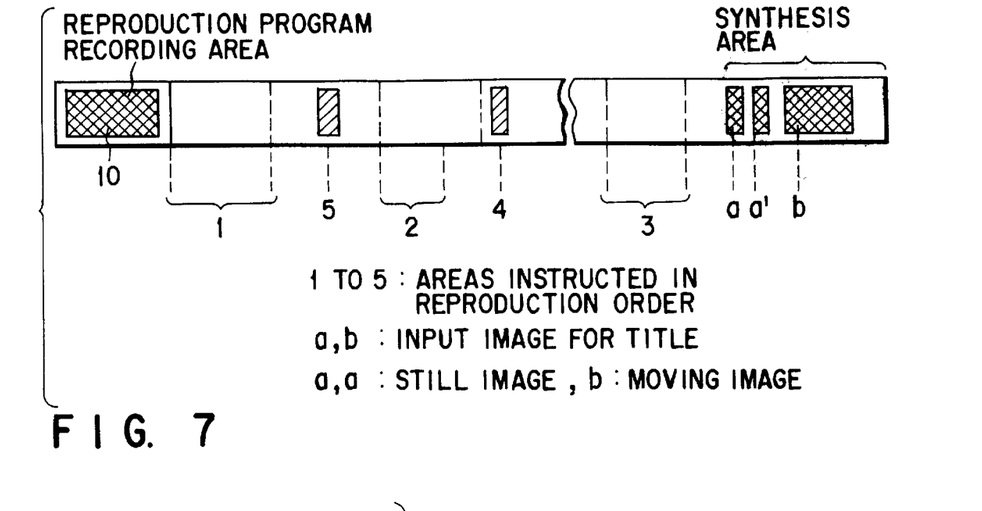
FIG. 7 is a schematic view showing a state in which moving and still images for a title are recorded in a synthesis area in the recording medium.

In the second embodiment, as shown in FIG. 7, moving and still images are recorded in a recording medium in the same form as that in the first embodiment.

Also in the second embodiment, the user can record a desired title image from a certain recording medium or the like, or a desired title formed by the user in a "free" area set at, e.g., the trailing portion of another recording medium.

More specifically, moving images of a family trip with title characters of the same color as the back-ground (see a and a' in FIG. 8A), and moving images of the family trip using animations (see b in FIG. 8B) are recorded as images.

The images of scenes which the user wants to see are determined in the same manner as in the first embodiment. In the case of moving image 1 synthesized with a separately recorded title still image, e.g., moving image 1 and the still images a and a' are recorded as a reproduction program in a reproduction program recording area of the recording medium with the operation unit of the video data edit/reproduction apparatus so as to synthesize them.

In reproduction, the programmed content is read by accessing this reproduction program recording area. Moving image 1 is synthesized and reproduced with the still image a or a' based on the read content for a predetermined period of time (e.g., about 1 to 2 sec for one still image).

With this processing, a so-called "synthesized/reproduced" image easily formed in reproduction can be displayed and output as if images (i.e., an image synthesized with scenes in a desired order, and the like) had already been edited in a separate recording medium.

As for the synthesis/reproduction method, for example, a predetermined color is sampled by a conventional method after reading the still image a. Only title characters are stored as image data in a memory and synthesized with images stored in units of video frames (e.g., $\frac{1}{60}$ images) of moving image 1. The resultant image is reproduced and output.

Similarly, the title moving images b can be obtained by synthesizing $\frac{1}{60}$ images of the title moving image on $\frac{1}{60}$ images of moving image 1.

As another reproduction method, it may be programmed to reproduce moving image 1 without synthesizing the still images a and a' for a predetermined period of time, and then sequentially reproduce desired images 1 to 5.

Figures 8A, 8B:
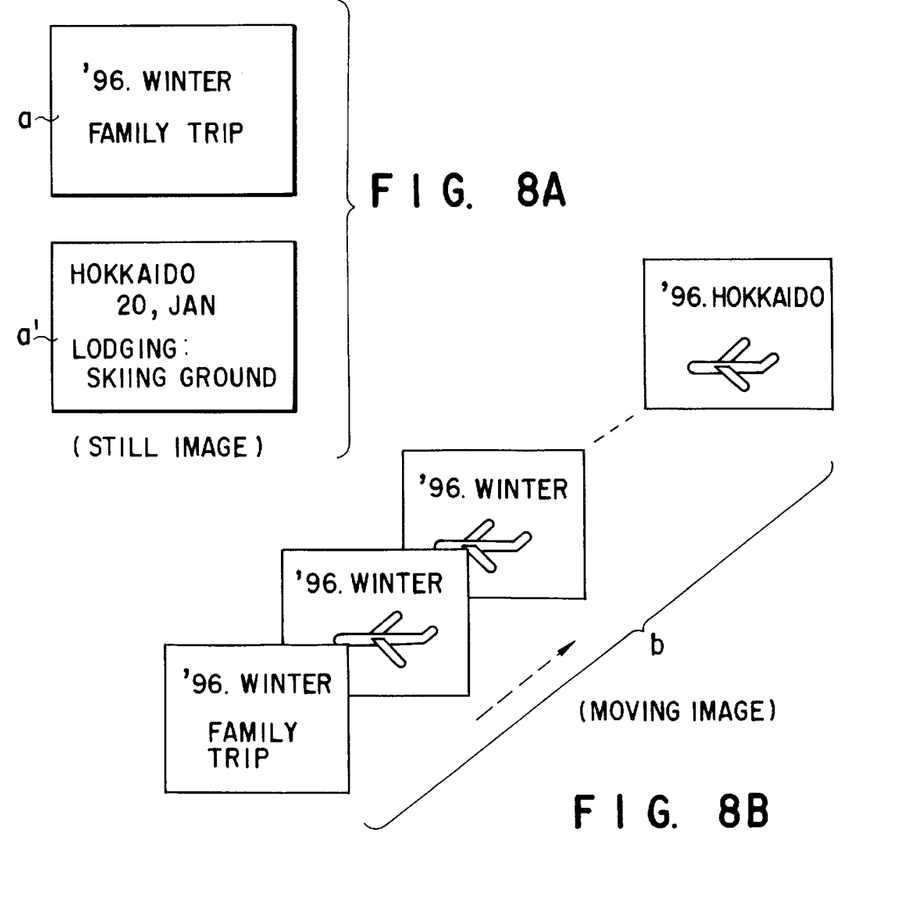
FIG. 8A is an illustration of still images showing an example of title images.
FIG. 8B is an illustration of moving images using animations showing an example of the title images.

As for the moving images b in FIG. 8B, relatively short moving images to be synthesized may be recorded in a synthesis area in the recording medium, and synthesized and reproduced in the same manner, as needed.

Figure 9:
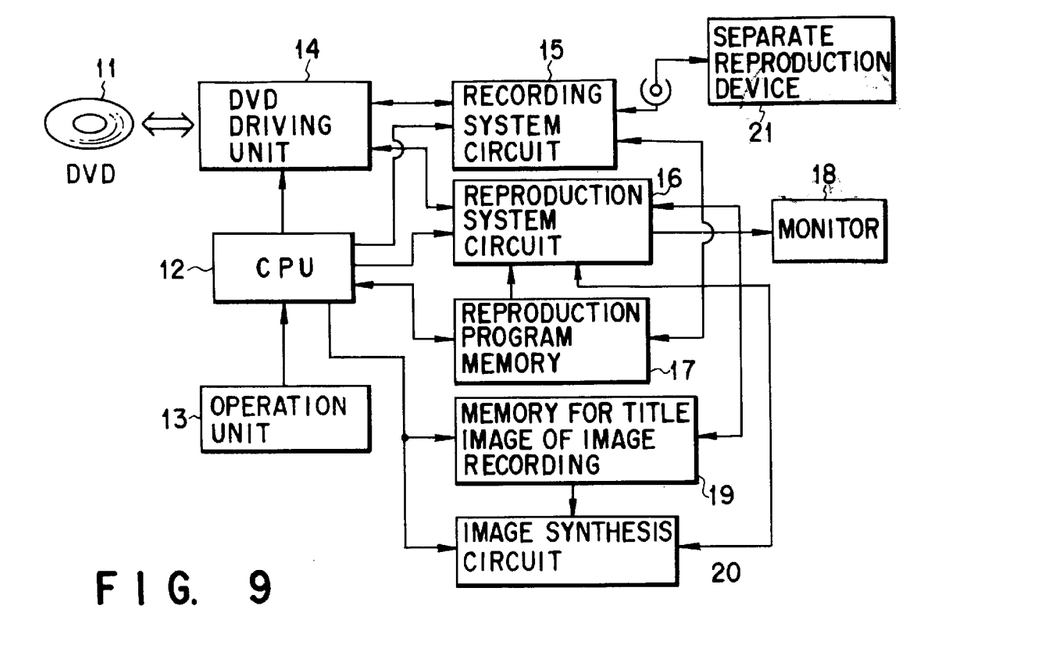
FIG. 9 is a block diagram showing the arrangement of a video data edit/reproduction apparatus according to the second embodiment of the present invention.

FIG. 9 is a block diagram showing the arrangement of the video data edit/reproduction apparatus according to the second embodiment of the present invention.

As a recording medium 11 to be used, this embodiment employs, e.g., a random-access digital video disk (to be referred to as a DVD hereinafter) capable of optically recording video data. Therefore, a plurality of high-resolution moving and still images can be digitally recorded at random.

Similar to the above-described first embodiment, the second embodiment comprises a control unit 12, an operation unit 13, a recording medium driving unit 14, a recording system circuit 15, a reproduction system circuit 16, a reproduction program storage unit 17, and a monitor 18 for editing and reproduction.

The video data edit/reproduction apparatus of the second embodiment further comprises a separate reproduction device 21 which serves as a device for inputting still images with title characters, moving images of animations, and the like, and is detachably connected to the image edit apparatus, a memory 19 for a title image or image recording which temporarily stores edit images to be synthesized and reproduced which have been reproduced and input by the separate reproduction device 21, and an image synthesis circuit 20 for controlling image synthesis processing.

Note that the separate reproduction device 21 may be a keyboard if only title characters are used, or an electronic camera, a scanner, or a personal computer which has a reproducing function.

Since the DVD can be rapidly accessed at random in real time, scenes can be quickly reproduced at random in a desired reproduction order. Synthesis and reproduction accesses are instantaneously performed in practice.

The present invention can be applied to a recording medium having performance equal to or superior to that of the DVD with which the user is not aware of an access operation or an access time, and a recording reproduction apparatus therefor.

Figure 10:
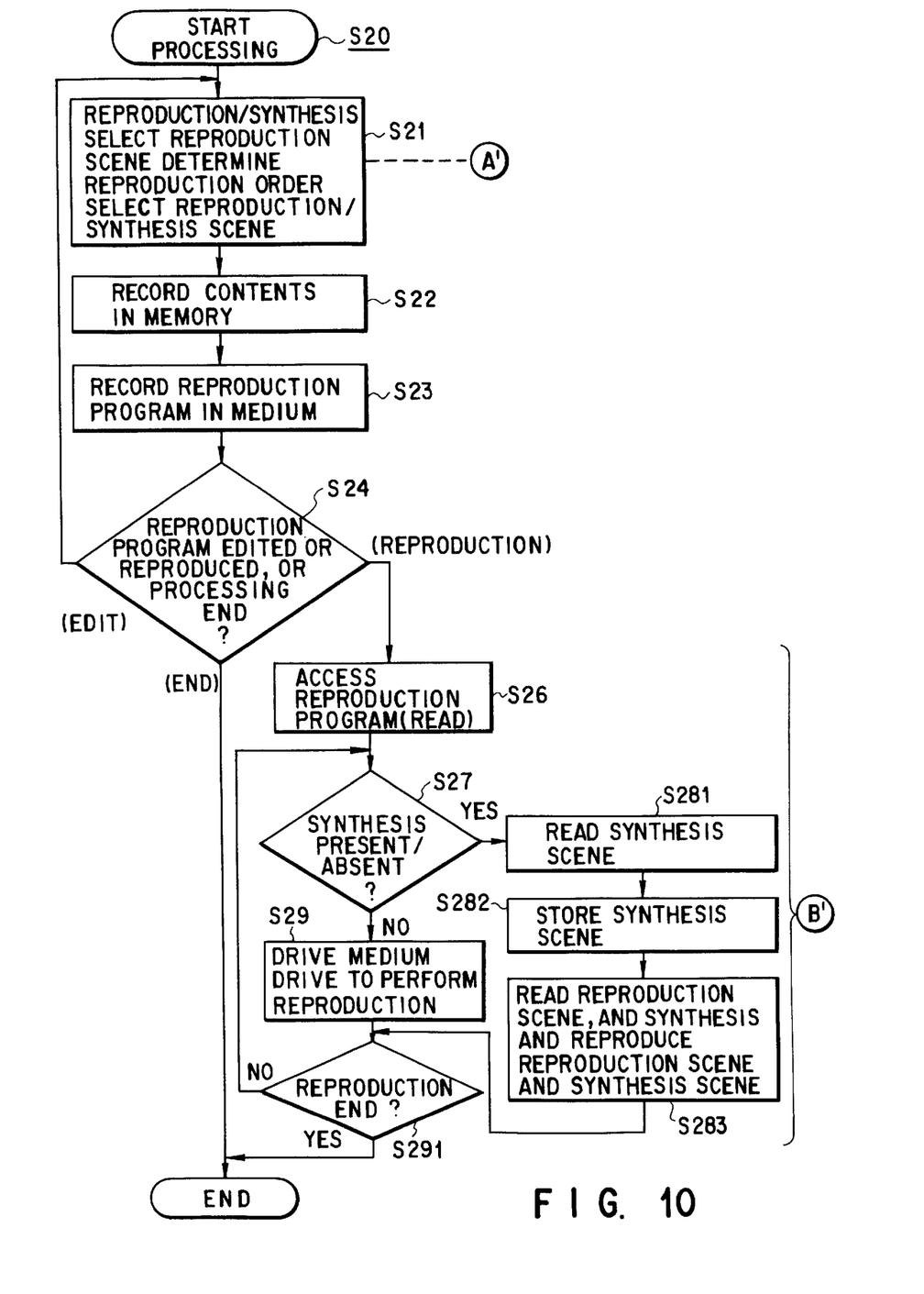
FIG. 10 is a flow chart showing the processing procedure of the video data edit/reproduction apparatus according to the second embodiment.

A flow chart shown in FIG. 10 exemplifies the processing operation procedure of the video data edit/reproduction apparatus according to the second embodiment.

Processing steps (A') and (B') are executed, in place of the groups A and B of the processing steps in FIG. 6 showing the processing operation of the first embodiment described above.

The video data edit/reproduction apparatus of the present invention comprises the separate reproduction device 21 separately connected thereto (FIG. 9), and can synthesize images. This video data edit/reproduction apparatus also has at least two modes, i.e., the "edit mode" and the "reproduction mode" as its functions.

In the "edit mode" indicated by A' in FIG. 10, video data about desired scenes are edited in step S21 after displaying the video data, which is also performed in the above-mentioned first embodiment.

For example, "association" between the selected scene and target synthesis data (e.g., a still image with title characters), and selection of a target synthesis scene are selected and instructed through the operation unit (step S21).

In addition to the above-described operation in the first embodiment, target synthesis image data such as a still image with desired title characters and a moving image of an animation are recorded in a "free area" of a recording medium (step S22). A reproduction program consisting of information about "association" between these moving and still images is written in a reproduction program recording area in the recording medium (step S23).

The mode is checked (step S24), and if the user wants to execute the above "edit mode" again, the flow returns to step S21.

To the contrary, if the user wants to end the flow, the flow is forcibly ended; if the user selects the "reproduction mode", processing is performed in accordance with the following operation procedure (B in FIG. 10).

First, the reproduction program is read from the recording medium 11 (step S26).

In addition to the above-described operation in the first embodiment, image synthesis processing is performed in accordance with the above association, as needed (see a and a' in FIG. 8A and b in FIG. 8B).

The presence/absence of synthesis is determined on the basis of the reproduction program (step S27).

When synthesis is performed, a synthesis scene is read from a corresponding position in the recording medium (step S281), and then the desired synthesis scene is temporarily stored in the memory 19 for a title image or image recording (step S282).

Next, a read of a reproduction scene, and synthesis and reproduction with this synthesis scene are performed by the image circuit 20 and the reproduction system circuit 16, respectively (step S283).

To the contrary, if the absence of image synthesis is determined in step S27, a moving image is reproduced by driving the recording medium without performing synthesis (step S29), and then the completion of the reproduction is determined (step S291).

If all desired images have not been reproduced, the flow returns to the above step S27 to repeatedly execute reproduction; if reproduction of all the images is complete, the above series of processing is ended.

As described above, according to the second embodiment, a title image always required for video data editing is recorded in advance in another area in the same recording medium, and synthesized and reproduced in accordance with a reproduction program. Edit images can be synthesized, reproduced, and observed in real time as if they had already been edited in another medium, without performing any cumbersome edit operation with respect to another recording medium, unlike in a conventional case.

This video data edit/reproduction apparatus can also perform editing of "image synthesis".

In addition, this apparatus can reproduce a synthesized image without newly recording a synthesized image of two images as one video signal data.

Since this apparatus synthesizes a moving image with a synthesis video signal still image, the processing circuit of the apparatus can be downsized.

Third Embodiment

A video data edit/reproduction apparatus according to the third embodiment of the present invention will be described with reference to FIGS. 11 and 12.

Assume that a reproduction program is generated as shown in FIG. 3 in the above-described first embodiment. When the user wants to reproduce and see scenes within a short period of time (i.e., wants to rapidly obtain a rough recording content of the recording medium), the reproduction position and time of the each scene can be calculated on the reproduction program on the basis of an address and a time code.

Figure 11:
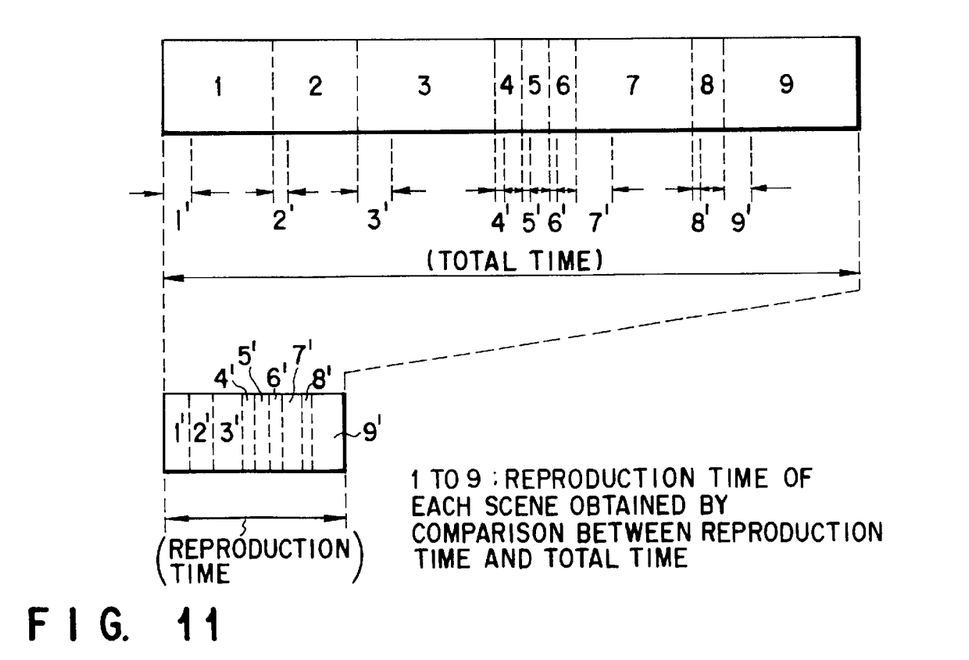
FIG. 11 is a view showing a comparison between the total reproduction time of video data recorded in the recording medium, and the reproduction time when representative scenes are extracted and reproduced.

For example, when the user wants to see scenes requiring one hour within six minutes, about 1/10 of each of the original reproduction times of the scenes respectively corresponding to images 1 to 9 is calculated to reproduce on the basis of the calculated time 1/10 of each scene which is a characteristic, desired portion, like the one shown in FIG. 11. In this manner, the main part of the recording content can be "automatically" reproduced and observed within a short period of time.

The content of each scene need not be confirmed by rapidly forwarding the recording medium with an "FF reproduction" operation and the like, unlike in a conventional case.

The video data edit/reproduction apparatus of this embodiment has the same arrangement of the second embodiment shown in the block diagram of FIG. 9.

Figure 12:
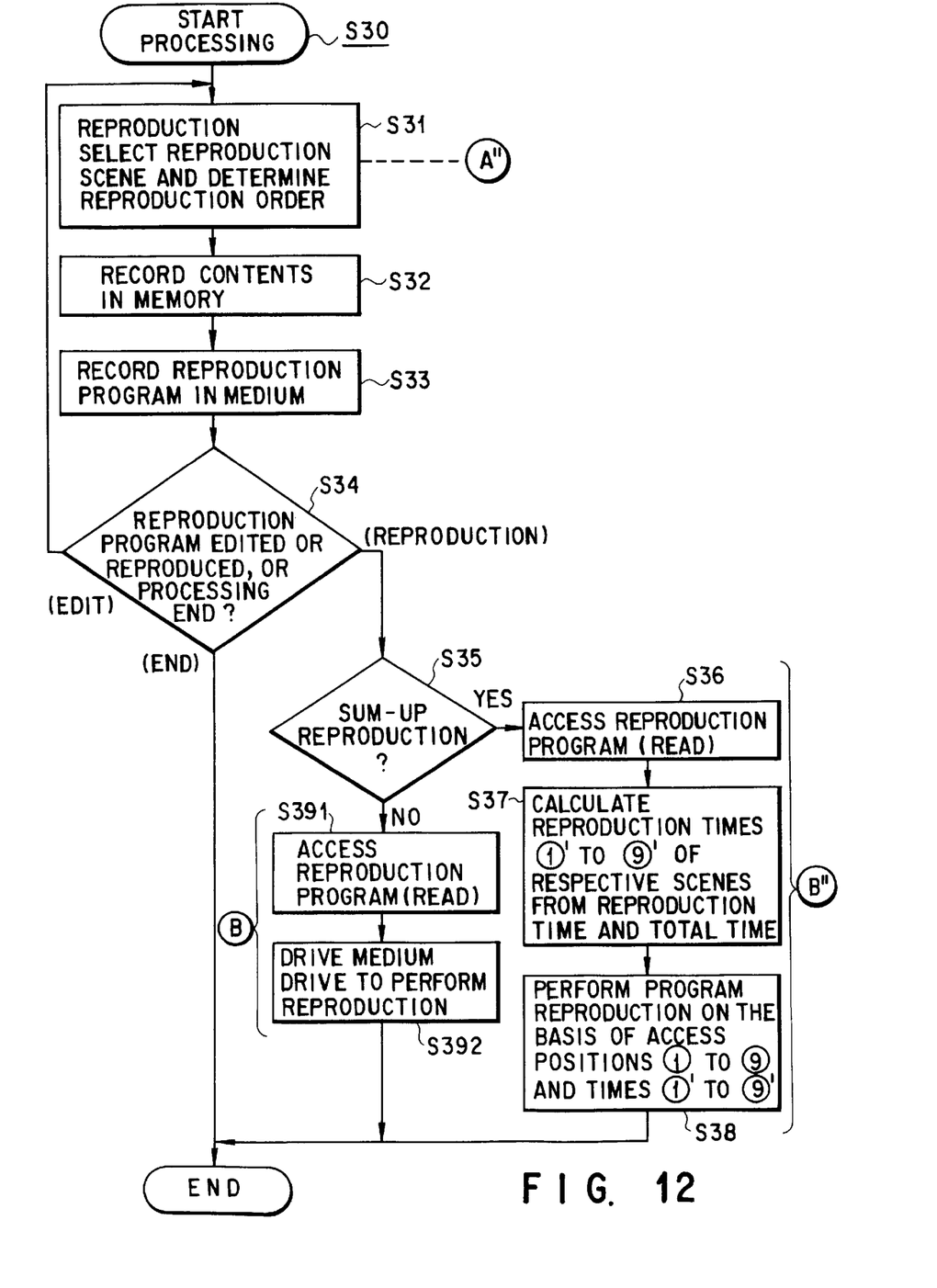
FIG. 12 is a flow chart showing the processing procedure of a video data edit/reproduction apparatus according to the third embodiment.

FIG. 12 is a flow chart showing a routine (S30) for defining a processing procedure in the third embodiment.

This embodiment also has at least two modes, i.e., the "edit mode" and the "reproduction mode" as its functions. An edited image can be output and displayed on a monitor 18, and confirmed.

In the "edit mode" indicated by A" in FIG. 12, the following operation procedure is performed.

First in step S31, video data recorded in a recording medium is reproduced by a reproduction system circuit 16, and displayed on the monitor 18.

The operator edits video data (i.e., creates a reproduction program) while observing the display.

That is, the areas of representative scenes (see FIG. 11) are selected from the video data recorded in the recording medium. The order of reproducing the selected scenes is determined by the user and designated with an operation unit 13 (step S31; see FIG. 11).

The reproduction program uses, as identification information, a "time code" or an "address" in a predetermined form which is added in advance to the recording medium in correspondence with the area of a representative scene.

The reproduction program generated in the above manner is temporarily stored in a reproduction program storage unit 17 in the video data edit/reproduction apparatus (step S32), and then recorded in a recording area set in a recording medium 11 such as a DVD in advance (step S33).

The mode is checked (step S34), and if the operator wants to execute the above-described "edit mode" again, the flow returns to step S31.

To the contrary, if the operator wants to end the flow, the flow is forcibly ended; if the operator selects the "reproduction mode", processing is performed in accordance with the following operation procedure (B" in FIG. 12).

That is, the "edit mode" is performed in the same processing procedure as that in the first embodiment, while the "reproduction mode" in this embodiment is performed in accordance with the following processing procedure.

First, upon reception of an instruction from the operation unit 13, a control unit 12 determines whether "sum-up reproduction" is to be performed (step S35).

If sum-up reproduction is instructed, the reproduction program is read (step S36). The "reproduction time" required to reproduce each scene is calculated on the basis of the desired "sum-up reproduction time" instructed and the total time of selected scenes (step S37).

The selected scenes are reproduced within the above reproduction time in accordance with the program, and the video data are displayed and output (step S38).

On the other hand, if "sum-up reproduction" is not determined in step S35, the recording medium is directly accessed in accordance with the reproduction program to sequentially read the selected scenes (step S391) and sequentially reproduce and output them (step S392).

Thus, the above series of processes are ended.

As described above, the video data edit/reproduction apparatus of the third embodiment can perform "automatic" reproduction of edited video data within a short time equal to the time required for actual "fast forwarding" of the recording medium. Therefore, the recorded contents can be reproduced within a short period of time without changing the reproduction speed, which allows the user to rapidly grasp the contents.

According to the third embodiment, when edited images are reproduced within a short period of time, so-called "sample reproduction" in which the respective edited scenes are reproduced at the same predetermined ratio can be performed.

Next, a video data edit/reproduction apparatus according to the fourth embodiment of the present invention will be described with reference to FIGS. 13, 14, and 15.

Figure 13:
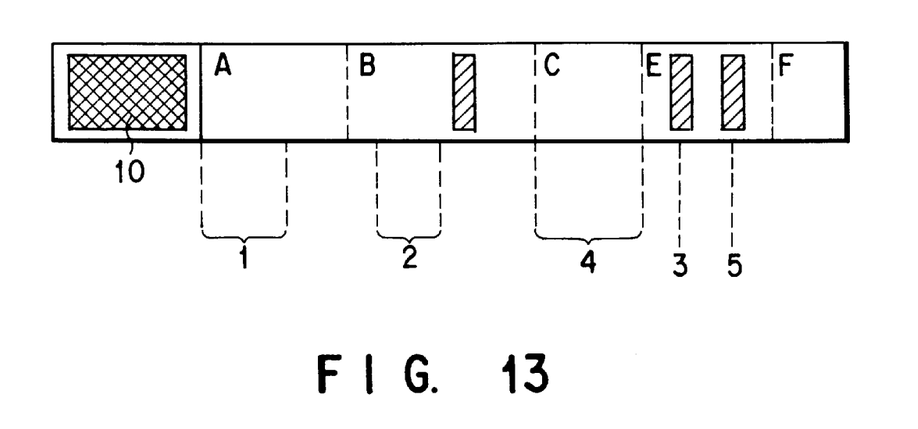
FIG. 13 is a schematic view showing unnecessary scenes present in the recording medium.
Figure 14:
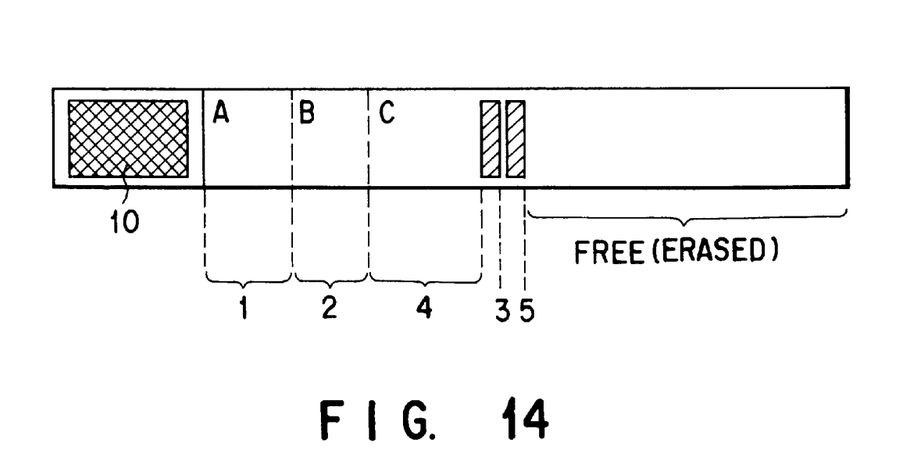
FIG. 14 is a schematic view showing a state in which the recording medium is re-arranged by erasing the unnecessary scenes from the recording medium.

The fourth embodiment is characterized by having a function capable of selectively erasing "unnecessary scenes" present in a recording medium like the ones shown in FIG. 13, and re-arranging the contents of the recording medium as shown in FIG. 14.

The following description is related to an example of the video data edit/reproduction apparatus which can re-arrange the contents of the recording medium by programming so that scenes not selected by the operator are regarded as "unnecessary" and only necessary scenes are left in a reproduction program.

Figure 15:
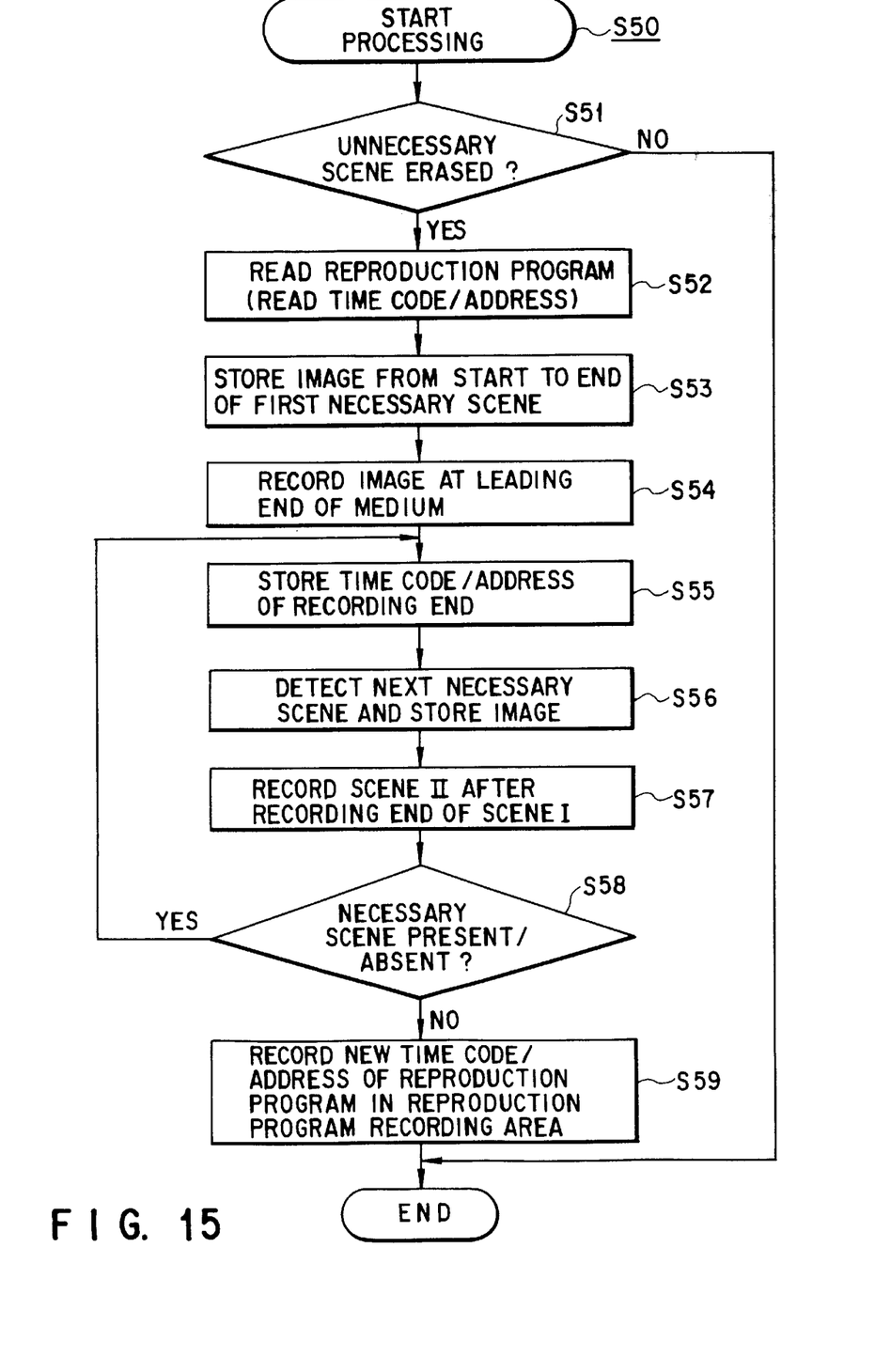
FIG. 15 is a flow chart showing the processing procedure of a video data edit/reproduction apparatus according to the fourth embodiment of the present invention.

FIG. 15 is a flow chart showing the processing procedure of a characteristic routine (step S50) of processing in this embodiment.

In addition to the operation of the first embodiment described above, the operator instructs through an operation unit whether an "unnecessary scene" is to be erased. Then, the mode is checked in step S51 of this routine (step S50).

If a mode not using an unnecessary scene erasing function has been designated, this processing routine is immediately ended.

To the contrary, if it is instructed to erase an unnecessary scene, the following processing steps are executed to erase video data corresponding to the unnecessary scene on the recording medium and sum up data (see FIG. 14).

When a recording state and a reproduction program like the ones shown in FIG. 13 are recorded in the recording medium, the reproduction program is first read from this recording medium (step S52).

By this access, the "start" and "end" of each necessary scene are obtained.

Scene moving image range 1 at the start of the necessary scenes is detected, and the video data from the start to end of this scene is temporarily stored in a memory (step S53).

This video data is recorded at the leading end of the recording medium (step S54), and the time code and address of the recording end of moving image range 1 are temporarily stored in the memory (step S55).

Subsequently, moving image range 2 as the next necessary scene is detected, and video data from the start to end of this scene is temporarily stored (step S56).

This video data is recorded after the storage area of moving image range 1 recorded in step S55.

The trailing end of the storage area of moving image range 1 is determined by the time code and address temporarily stored in the memory (step S57).

In this manner, the same processing steps (S55 to S57) are repeatedly executed until it is determined in step S58 that all necessary scenes have been processed. With this processing, only necessary scenes can be rearranged and recorded in a "frame packing" state in the same recording medium, as shown in FIG. 14.

If the completion of the above "frame packing" is determined, the addresses and time codes of the respective necessary scenes are recorded as a new reproduction program in the recording medium on the basis of a predetermined form (step S59).

Then, the above series of processes are ended.

If needed, the recording medium may be initialized by clearing to zero or null in order to logically erase data in areas in which unnecessary scenes are stored.

The above processing routine (S50) may be modified to allow the user to automatically determine or easily select whether unnecessary scenes are to be erased after the reproduction program is determined.

As for storage of necessary scenes, if one scene is divided into several portions and sequentially recorded as far as time allows, the storage capacity of the memory used during processing can be decreased.

In this case, the time code or address of the shifted video data is rewritten in correspondence with the time code or address of the video area of the program in the reproduction order which exists in the reproduction program recording area, as a matter of course.

According to the fourth embodiment described above, in the "edit mode", the data structure of recorded images shown in FIG. 13 can be re-arranged to a simple data structure like the one shown in FIG. 14 by performing video data editing based on the processing routine S50 in FIG. 15, while displaying the images in the video pattern shown in FIG. 13 on the monitor.

In this case, the reproduction program can be newly rewritten by recording a new address and time code in the reproduction program recording area.

Since unnecessary video data is erased, and the recording medium newly has a "free" area capable of recording another video data, the recording medium can be saved.

Since an unnecessary, nonedited portion is erased from the recording medium upon image editing, and "frame packing" is automatically performed, the recording medium does not have a wasteful portion and can be efficiently used.

Another Modification

As a video reproduction means, a display output means (monitor), a reproduction system circuit, or another reproduction device may be employed.

As a selection means, an operation means including a keyboard, and a program for setting and displaying choices may be employed.

As a recording means, a directly accessible recording medium and a recording device including a dedicated recording system circuit may be employed, in addition to a DVD.

A plurality of embodiments have been described. The present specification comprises the following inventions.

(1) A video data edit/reproduction method is characterized by selecting part of video data recorded in a predetermined recording medium, designating a predetermined order when the selected video data consists of a plurality of portions, converting the selected video data into address information about recording positions on the recording medium or time information about recording times, generating a reproduction program in which the converted conversion information is defined with the order, and editing the video data so as to reproduce the video data in accordance with the reproduction program.

(2) A video data edit/reproduction apparatus is characterized by comprising a video reproduction means for reproducing video data recorded in a predetermined recording medium, a selection means for selecting desired part of the video data, and designating a predetermined order when the selected video data consists of a plurality of portions, and a recording means for converting the selected video data into address or time information on the recording medium, and recording the converted conversion information together with the order, wherein the video data selected by the video reproduction means is reproduced on the basis of the conversion information or the order recorded by the recording means.

(3) A video data edit/reproduction apparatus defined in (1) or (2) is characterized in that the conversion information and the order are recorded and held in the same recording medium.

In addition, the present specification comprises the following inventions.

(4) A video data edit/reproduction method is characterized by selecting part of video data recorded in a predetermined video recording disk, designating the order when the selected video data consists of a plurality of portions, converting the selected video data into address or time information on the video recording disk, generating a reproduction program in which the converted conversion information is defined with the order, and reproducing the video data in accordance with the reproduction program.

(5) A video data edit/reproduction apparatus is characterized by comprising a video reproduction means for reproducing video data recorded in a video recording disk, a selection means for selecting part of the video data, and designating the order when the selected video data consists of a plurality of portions, and a recording means for converting the selected video data into address or time information on the video recording disk, generating a reproduction program in which the converted conversion information is defined together with the order, and recording the reproduction program, wherein the video data selected by the video reproduction means is reproduced on the basis of the conversion information or the order recorded by the recording means.

(6) A video data edit/reproduction apparatus is characterized by comprising a video reproduction means for reproducing moving or still images recorded in a random-access video recording disk, and a means for editing the moving or still images to generate a reproduction program for defining the editing results, wherein images are reproduced on the basis of the reproduction program.

(7) A video data edit/reproduction apparatus defined in (4) to (6) is characterized in that the video recording disk has an area in which the contents of the reproduction program are recorded, and at least one reproduction program is recorded in the video recording disk.

(8) A video data edit/reproduction apparatus defined in (4) to (6) is characterized in that two or more images are synthesized and reproduced on the basis of the reproduction program.

(9) A video data edit/reproduction apparatus defined in (4) to (6) is characterized by further comprising a second reproduction means for generating an image which is to be synthesized with video data recorded in the video recording disk in advance.

(10) A video data edit/reproduction apparatus defined in (8) or (9) is characterized in that the image to be synthesized is a still image.

(11) A video data edit/reproduction apparatus defined in (4) to (6) is characterized in that sum-up reproduction is performed on the basis of the reproduction program.

(12) A video data edit/reproduction apparatus defined in (11) is characterized by further comprising an instruction means for instructing the sum-up reproduction time.

(13) A video data edit/reproduction apparatus defined in (4) to (6) is characterized in that, when selected images include still images in reproducing the images in accordance with the reproduction program, only the still images are reproduced at once.

(14) A video data edit/reproduction apparatus defined in (10) is characterized in that, when only the still images are reproduced at once, a plurality of still images are simultaneously displayed on a multiwindow display on one screen.

(15) A video data edit/reproduction apparatus defined in (4) to (6) is characterized in that, of data recorded in the video recording disk, data corresponding to images not selected by the selection means or in editing are automatically "frame-packed" from a memory.

(16) A video data edit/reproduction apparatus is characterized by comprising a video recording disk with a recording area for recording a reproduction program which is obtained by selecting part of recorded video data, designating the order when the selected video data consists of a plurality of portions, and converting the video data into address or time information, and defines the converted information together with the order.

As has been described in detail above, the present invention has the following effects.

First, the present invention does not require such a cumbersome edit operation as to eliminate unnecessary scenes by dubbing or the like from a recording medium used in photographing.

According to the present invention, the reproduction order can be changed without moving video data in the recording medium, unlike in a conventional case.

According to the present invention, therefore, there can be provided a video data edit/reproduction apparatus which can easily perform editing/reproduction only by determining and designating the ranges and order of images to be reproduced in a recording medium without physically moving original image information recorded in the recording medium or without performing dubbing processing using another recording medium.

Additional embodiments of the present invention will be apparent to those skilled in the art from consideration of the specification and practice of the present invention disclosed herein. It is intended that the specification and examples be considered as exemplary only, with the true scope of the present invention being indicated the following claims.

Additional advantages and modifications will readily occur to those skilled in the art. Therefore, the invention in its broader aspects is not limited to the specific details and representative embodiments, shown and described herein. Accordingly, various modifications may be made without departing from the spirit or scope of the general inventive concept as defined by the appended claims and their equivalents.

I claim:

1. A video data edit/reproduction apparatus for editing and reproducing video data recorded in a video recording disk together with at least one of address information and time information on said video recording disk, the video data edit/reproduction apparatus comprising:

operation means for designating desired portions of the video data recorded in said video recording disk, and designating a reproduction order of the video data at the desired portions;

recording means for recording a reproduction program in a preset area of said video recording disk together with (i) the designated reproduction order, and (ii) at least one of address information and time information on said video recording disk for the video data at the desired portions designated by said operation means;

storage means for reproducing and storing the reproduction program recorded by said recording means in a preset area of said video recording disk;

reproduction means for reproducing the video data at the desired portions from the video data recorded in said video recording disk in the reproduction order in accordance with the reproduction program from said storage means; and means for erasing, of the video data recorded in said video recording disk, data of an image not designated by said operation means, and transferring the designated video data into an erased area.

2. An apparatus according to claim 1, wherein the video recording disk has a plurality of reproduction programs recorded therein.

3. An apparatus according to claim 1, wherein said recording means comprises synthesis data generating means for generating video data to be synthesized with the video data recorded in said video recording disk.

4. An apparatus according to claim 3, wherein the video data to be synthesized includes a still image.

5. An apparatus according to claim 1, wherein said operation means comprises means for designating whether a reproduction time of the designated video data is shortened to reproduce the video data.

6. An apparatus according to claim 5, wherein said operation means comprises means for designating a sum-up reproduction time when the reproduction time of the designated video data is shortened to reproduce the video data.

7. An apparatus according to claim 6, wherein said reproduction means comprises means for determining the reproduction time of the designated video data in accordance with the sum-up reproduction time designated by said operation means.

8. An apparatus according to claim 1, wherein when the designated video data includes still images in reproducing the video data recorded in said video recording disk in accordance with the reproduction program, said reproduction means first reproduces the images at once.

9. An apparatus according to claim 8, wherein when the still images are reproduced at once, said reproduction means reproduces the still images on a multiwindow display in which a plurality of still images are simultaneously displayed on one screen.

10. A video data edit/reproduction apparatus for editing and reproducing video data recorded in a predetermined recording medium together with at least one of address information and time information on said predetermined recording medium, the video data edit/reproduction apparatus comprising:

operation means for designating desired portions of the video data recorded in said predetermined recording medium, and designating a reproduction order of the video data at the desired portions;

recording means for recording a reproduction program in a preset area of said predetermined recording medium together with (i) the designated reproduction order, and (ii) at least one of address information and time information on said predetermined recording medium for the video data at the desired portions designated by said operation means;

storage means for reproducing and storing the reproduction program representing edit information recorded by said recording means in a preset area of said predetermined recording medium;

reproduction means for reproducing the video data at the desired portions from the video data recorded in said predetermined recording medium in the reproduction order in accordance with the reproduction program representing edit information from said storage means; and means for erasing, of the video data recorded in said predetermined recording medium, data of an image not designated by said operation means, and transferring the designated video data into an erased area.

11. An apparatus according to claim 10, wherein said recording means comprises synthesis data generating means for generating video data to be synthesized with the video data recorded in said predetermined recording medium.

12. An apparatus according to claim 11, wherein the video data to be synthesized includes a still image.

13. An apparatus according to claim 10, wherein said operation means comprises means for designating whether a reproduction time of the designated video data is shortened to reproduce the video data.

14. An apparatus according to claim 13, wherein said operation means comprises means for designating a sum-up reproduction time when the reproduction time of the designated video data is shortened to reproduce the video data.

15. An apparatus according to claim 14, wherein said reproduction means comprises means for determining the reproduction time of the designated video data in accordance with the sum-up reproduction time designated by said operation means.

16. An apparatus according to claim 10, wherein when the designated video data includes still images in reproducing the video data in accordance with the reproduction program, said reproduction means first reproduces the images at once.

17. An apparatus according to claim 16, wherein when the still images are reproduced at once, said reproduction means reproduces the still images on a multiwindow display in which a plurality of still images are simultaneously displayed on one screen.

* * * * *